United States Patent [19]

Budzich et al.

[11] Patent Number: 4,459,892

[45] Date of Patent: Jul. 17, 1984

[54] METHOD AND APPARATUS FOR SEVERING STRANDED CABLE

[75] Inventors: Mieczyslaw Budzich, Lexington; Forest G. Fitz, Jr., West Columbia, both of S.C.

[73] Assignee: Nassau Recycle Corporation, Staten Island, N.Y.

[21] Appl. No.: 378,698

[22] Filed: May 17, 1982

[51] Int. Cl.³ .............................................. B23D 25/02
[52] U.S. Cl. ..................................................... 83/880
[58] Field of Search .................. 83/37, 872, 873, 883, 83/884, 875, 51, 878, 566, 568, 321, 329, 343, 344, 345, 917, 923, 879, 880, 881, 885, 886, 887; 241/235; 29/23

[56] References Cited

U.S. PATENT DOCUMENTS 1,589,595  6/1926  Hitchcock ............................. 72/188
1,814,867  7/1931  Swift ..................................... 83/117

Primary Examiner—James M. Meister
Assistant Examiner—J. L. Knoble

[57] ABSTRACT

A method and apparatus are disclosed for severing a cable formed by strands twisted together with a helical lay wherein a first notch is cut in the cable and a second notch is cut in the cable to a notch depth in excess of the cable width less the depth of the first notch at a location longitudinally spaced from the first notch a distance such that for the lay length of the strands all of the strands are severed by at least one of the notches.

5 Claims, 4 Drawing Figures

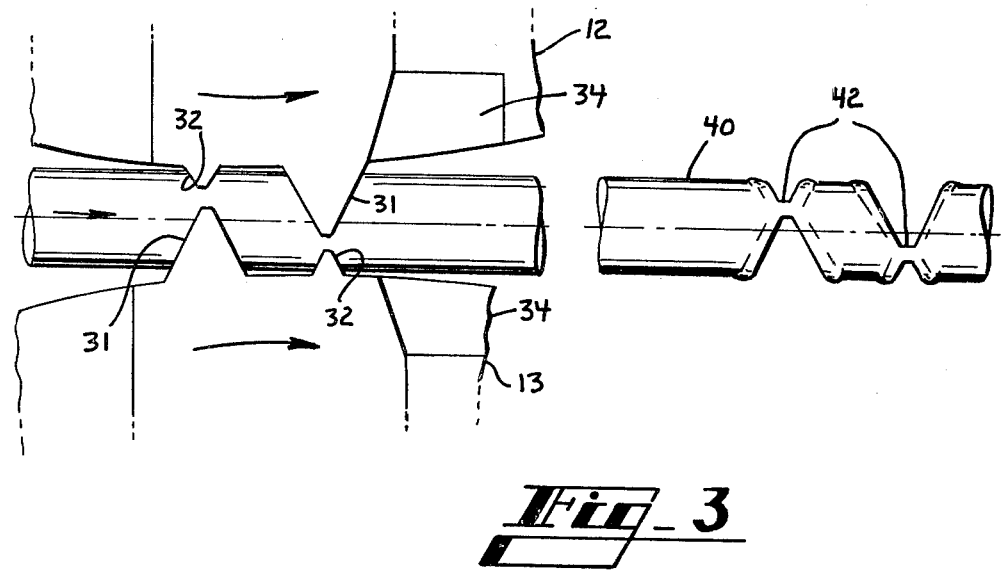
Fig_3
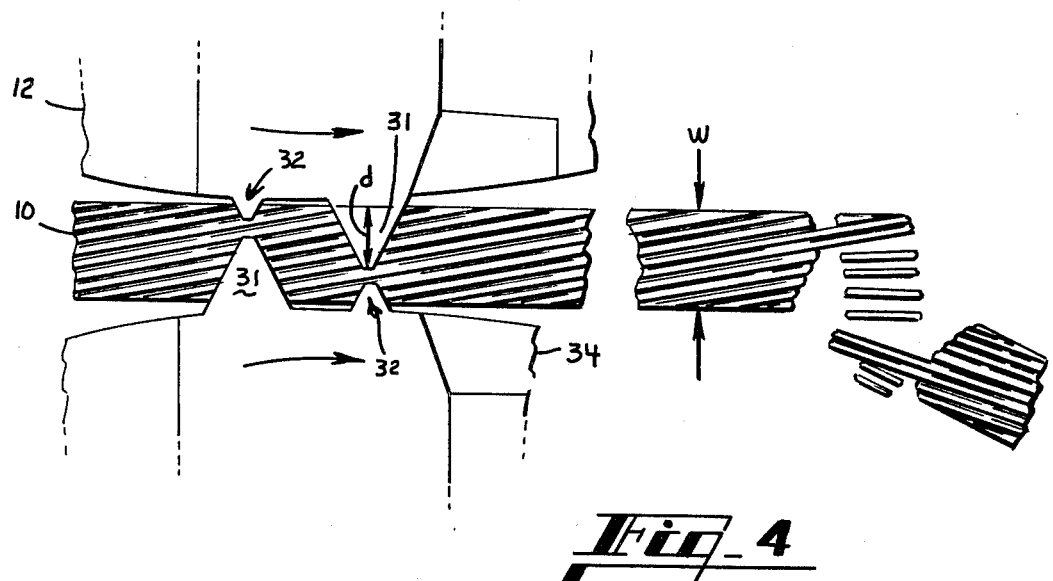
Fig_4
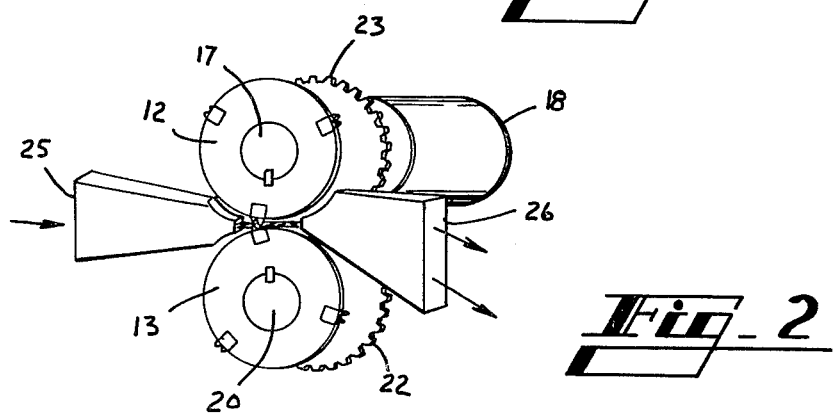
Fig_2

METHOD AND APPARATUS FOR SEVERING STRANDED CABLE

TECHNICAL FIELD

This invention relates to methods and apparatuses for severing stranded cables.

BACKGROUND OF THE INVENTION

Stranded cable today is usually severed on an automated, continuous basis by passing the cable through two blade-bearing, counter-rotating wheels of a cutter. Passage of the blade edges along mutually tangential arcs causes the cable to be completely severed. Repeated usage of such pinch-type cutters however causes their blades to wear and become dull. As the blades wear a gap is formed between them at their point of closest approach or orbital perigee. As the gap enlarges a point is soon reached where one or more of the cable strands passes completely through it without being severed. When this occurs it is necessary to snap off the partially cut strand manually. As the gap enlarges it will become necessary to replace the worn blades with new ones due to the increased thickness of the unsevered strands.

The just-described problem can be avoided through the use of stranded cable cutters of a type that employ a shearing rather than a pinching action since shearing blades overlap during a shearing stroke even after their edges have become worn. However, since shearers intermittently arrest the advancing movement of the cable momentarily it is necessary to associate intermittent cable feed mechanisms with them. This complicates the entire cutter apparatus and renders it more costly. It also imposes speed limitations on the operation that otherwise would not be present.

SUMMARY OF THE INVENTION

The just-described problem is alleviated by the present invention wherein in one form thereof a method of severing cable of width w formed by strands twisted together with a helical lay of a predetermined lay length comprises the steps of cutting a first notch of depth d in the cable at a first location and cutting a second notch of a depth in excess of w−d in the cable at a second location longitudinally spaced from the first location a distance such that for the predetermined lay length none of the strands extends helically through the first and second locations unsevered by at least one of said notches.

In another form of the invention apparatus for severing a cable of width w formed by strands twisted together with a helical lay of a predetermined lay length comprises means for cutting a first notch of a depth d in the cable at a first location and means for cutting a second notch of a depth in excess of w−d at a second location longitudinally spaced from the first location a distance such that for the predetermined lay length none of the strands extends helically through the first and second locations unsevered by at least one of said notches.

In yet another form of the invention apparatus for severing multi-stranded cable comprises a pair of wheels mounted for rotary movement about axes located along opposite sides of a path of cable travel with each wheel bearing a relatively long and a relatively short peripheral cutting tooth. The apparatus also includes means for rotating the wheels about the axes with the short tooth of one wheel passing substantially tangentially to the long tooth of the other wheel and with the long tooth of the one wheel passing substantially tangentially to the short tooth of the other wheel. So constructed and operated all strands of a multi-stranded cable may continue to be severed by the apparatus when gaps of limited sizes have become present between cooperating teeth as the teeth wear and cease to pass in substantially mutual tangency.

BRIEF DESCRIPTION OF THE DRAWING

FIG. 2 is a perspective view of the apparatus shown in FIG. 1;

FIG. 3 is a side elevational view of a solid rod being cut with the apparatus shown in FIGS. 1 and 2 having worn teeth; and FIG. 4 is a side elevational view of a multi-stranded cable being cut with the apparatus shown in FIGS. 1 and 2 having worn teeth.

DETAILED DESCRIPTION

Figure 1:
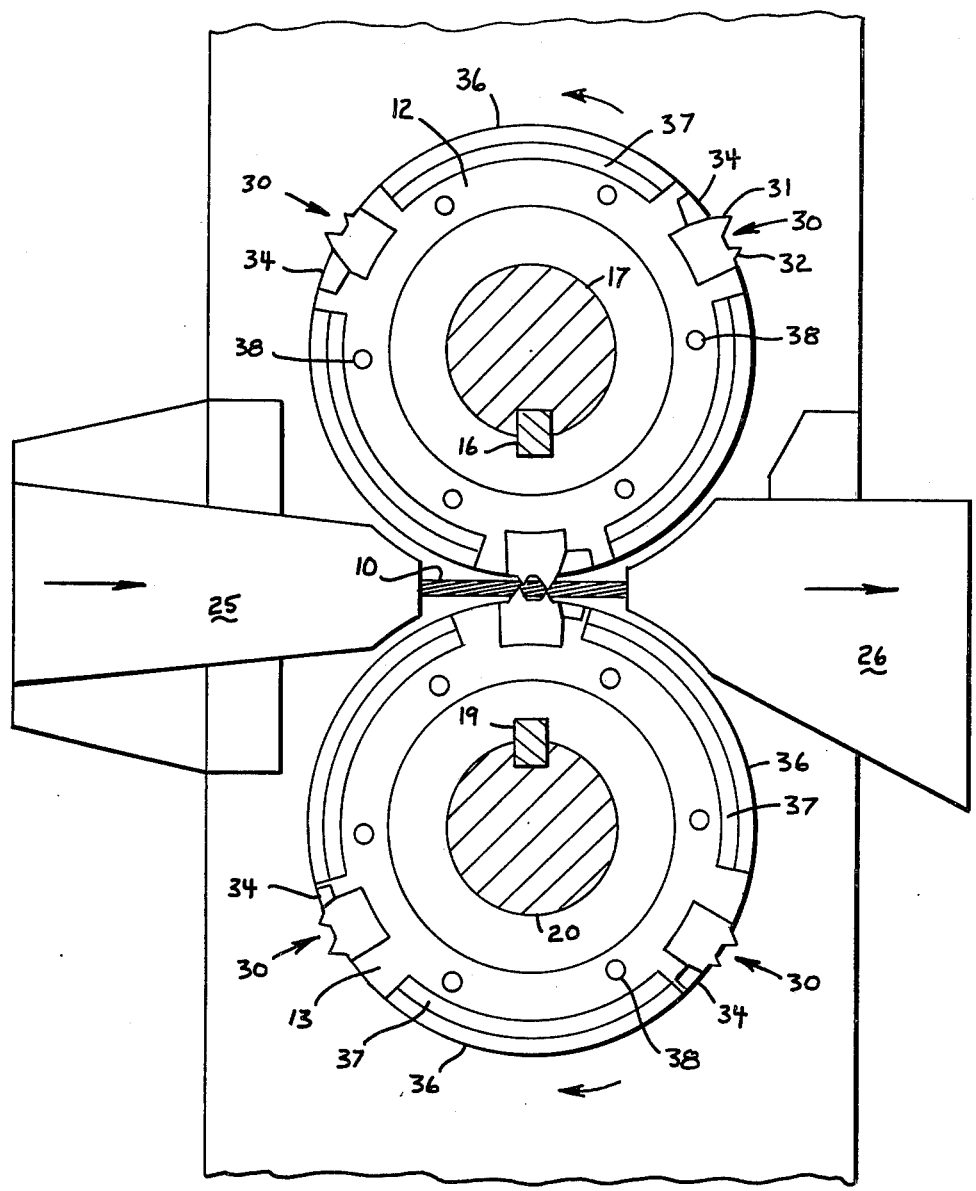
FIG. 1 is a side elevational view of apparatus embodying principles of the present invention being used in practicing a method of the invention.

With reference next to the drawing apparatus is shown for cutting a cable 10 formed of a group of strands twisted together in a left-hand lay of a selected lay length. By "lay length" is meant the longitudinal distance along the cable for a strand to complete one helical turn. The apparatus has an upper steel wheel 12 and a lower steel wheel 13. The upper wheel 12 is mounted with the aid of a key 16 in a keyway to a drive shaft 17 that is coupled via an unshown gearbox to a motor 18. The lower wheel 13 is similarly mounted with a key 19 to a drive shaft 20. The drive shaft 20 is coupled with the motor 18 through power transmission means that includes a gear 22 mounted to shaft 20 in mesh with another gear 23 mounted to the drive shaft 17. If desired, a flywheel may also be mounted on the shaft 17 to provide additional energy for cutting. The two shafts 17 and 20 are spaced apart a distance so as to position the periphery of the two wheels at their point of closest approach or orbital perigee a distance apart just slightly greater than the diameter of the cable 10 as best seen in FIG. 4. As shown in FIG. 2 an input chute 25 is also provided as is an output chute 26 for manual handling safety.

With continued reference to the drawing each wheel is seen to have three double-toothed cutting blades noted generally at 30 mounted at 120° angular spacings upon their peripheral surfaces. Other angular spacings may, of course, be employed, in conjunction with selected wheel diameters, in order to provide desired cut cable segment lengths. Each cutting blade has a relatively long tooth 31 and a relatively short tooth 32 with the size of the long teeth being equal prior to tooth wear as are the sizes of the short teeth, initially. The dimension d of the various long teeth is such that the teeth overlap in the direction normal to the cable axis, i.e., the dimension exceeds the radius of the cable or w/2 where w is the width of the cable. Thus, when one long tooth 31 cuts a notch depth d, the other cooperating long tooth 31 cuts a notch of depth d also, which again is in excess of the cable width w less depth d, in the opposite side of the cable at a location longitudinally spaced from the other notch. The teeth themselves are all part of unitary, hardened tool steel blades that are held in place within peripheral depressions in the wheels by means of retainer blocks 34 screwed into the wheel within the peripheral depressions overlapping a portion of the cutting blades. Between each of the cutter blades is also mounted to the wheels a steel drive shoe 36 above a rubber pad 37. These are held to the wheels by means of pins 38 so as to permit limited movement of the steel pads radially against the resilient rubber pads.

In operation a cable 10 is fed into the input chute 25 and into contact with the rotating wheels. The drive shoes 36 seize the cable and advance it between the rotating wheels. A pair of cooperating blades are then brought into cutting engagement with the cable and thereby cut notches into it in a manner so as to sever all of the cable strands. The cut segment is then propelled into the output chute 26. As the successive drive shoes seize and advance the following cable section the process is repeated.

In order to appreciate more fully the severance method reference is next made to FIGS. 3 and 4. In FIG. 3 a solid rod 40 is seen to be advancing through the apparatus shown in FIGS. 1 and 2. It will be noted here that the edges of blade teeth 31 and 32 has been worn through usage so that there is a small gap existing between the mutually aligned teeth of the two blades at their orbital perigee. As a result a rod bridge 42 will remain intact after the cutting operation due to the presence of this blade gap. Therefore, the solid rod is not completely severed although the gap may be small enough so that the rod can be self-broken by its own weight or broken manually or automatically by ancillary equipment. However, where multi-stranded elongated material such as a cable is cut with the same equipment whose worn blade teeth present gaps therebetween as shown in FIG. 4, a complete severance will be effected by the cutting action of the present apparatus. In FIG. 4 it is seen that all of the strands are cut by at least one of the four teeth of the apparatus. There is only one possibility of complete severance not being effected and that is where the angle of the strand helix or lay length is that which enables a strand to pass through both of the gaps. For example, where notches to be cut by single-toothed blades into opposite sides of a cable at locations spaced longitudinally apart one-half the lay length of the strands, some of the strands would, of course, not be severed. This situation however is easily avoided by proper selection of the orientation of the cutter blades so that the gaps created are aligned oppositely to the helical lay of the stranded material as in the example of FIG. 4, and/or by alteration of the spacing between the blade teeth.

It thus is seen that a method and apparatus is provided for severing multi-stranded cable that is of relatively simple construction not requiring intermittent cable feed apparatus as necessitated by cutters employing a shearing-type of cutting action. The pinch-type cutter for the multi-teeth design shown and described continues to operate effectively long after gaps have appeared between the cooperating teeth members of the cutter blades. In the manner described a continuous cutting operation may be effected for substantial periods of time before the teeth have worn to such an extent that complete severance of multi-strand cable is no longer effected.

Though in the illustrated, preferred embodiment the two cutter wheel shafts have been driven about parallel axes such is not essential so long as the longitudinally spaced notches formed by their teeth overlap sufficiently to effect the complete severing action sought. In addition, though the illustrated cutter blades are double-toothed, such also is not essential. The shorter teeth may be eliminated and replaced with a generally flat blade anvil section with the attendant advantage of not requiring the degree of cooperating blade alignment as is required with the double-tooth blade version. However, where the cable is of a hardened material the double-tooth configuration is preferred in order to reduce the cutting depth and thereby to reduce the rate of tooth wear. If only two teeth are employed they may be parts of a single blade located on one side of the cable providing their spacing is such, relative to the lay length of the cable strands, to assure that all strands are severed. It thus should be understood that the just-described embodiment merely illustrates principles of the invention in one preferred form. Many other modifications, additions and deletions, may of course, be made thereto without departure from the spirit and scope of the invention as set forth in the following claims.

What is claimed is:

1. A method of severing a cable of width w formed by strands twisted together with a helical lay of a predetermined lay length and with the method comprising the steps of cutting a first notch of depth d in the cable at a first location and cutting a second notch of a depth in excess of $w-d$ in the cable at a second location longitudinally spaced from the first location a distance such that for the predetermined lay length none of the strands extends helically through the first and second locations unsevered by at least one of said notches.

2. A method of severing a multi-stranded cable in accordance with claim 1 wherein d exceeds $w/2$.

3. A method of severing a multi-stranded cable in accordance with claim 1 or 2 wherein the second notch is cut to a depth of $d'$ and wherein $d'$ is substantially equal to d.

4. A method of severing a multi-stranded cable of width w formed by strands twisted together with a helical lay of a predetermined lay length and with the method comprising the steps of cutting a first notch of depth d in the cable at a first location, cutting a second notch of a depth in excess of $w-d$ in the cable at a second location longitudinally spaced from the first location a distance such that for the predetermined lay length none of the strands extends helically through the first and second locations unsevered by at least one of said notches, cutting a third notch in the cable at the longitudinal position of the first notch but in the side of the cable opposite the first notch, and cutting a fourth notch in the cable at the longitudinal position of the second notch but in the side of the cable opposite the second notch.

5. Apparatus for severing a cable of width w formed by strands twisted together with a helical lay of a predetermined lay length comprising means for cutting a first notch of a depth d in the cable at a first location, means for cutting a second notch of a depth in excess of $w-d$ at a second location longitudinally spaced from the first location a distance such that for the predetermined lay length none of the strands extends helically through the first and second locations unsevered by at least one of said notches, means for cutting a third notch in the cable at the longitudinal position of the first notch opposite the first notch and means for cutting a fourth notch in the one side of the cable at the longitudinal position of the second notch opposite the second notch.

* * * * *